(No Model.) 2 Sheets—Sheet 1.
E. P. LYNCH.
WHEEL CULTIVATOR.
No. 257,730. Patented May 9, 1882.
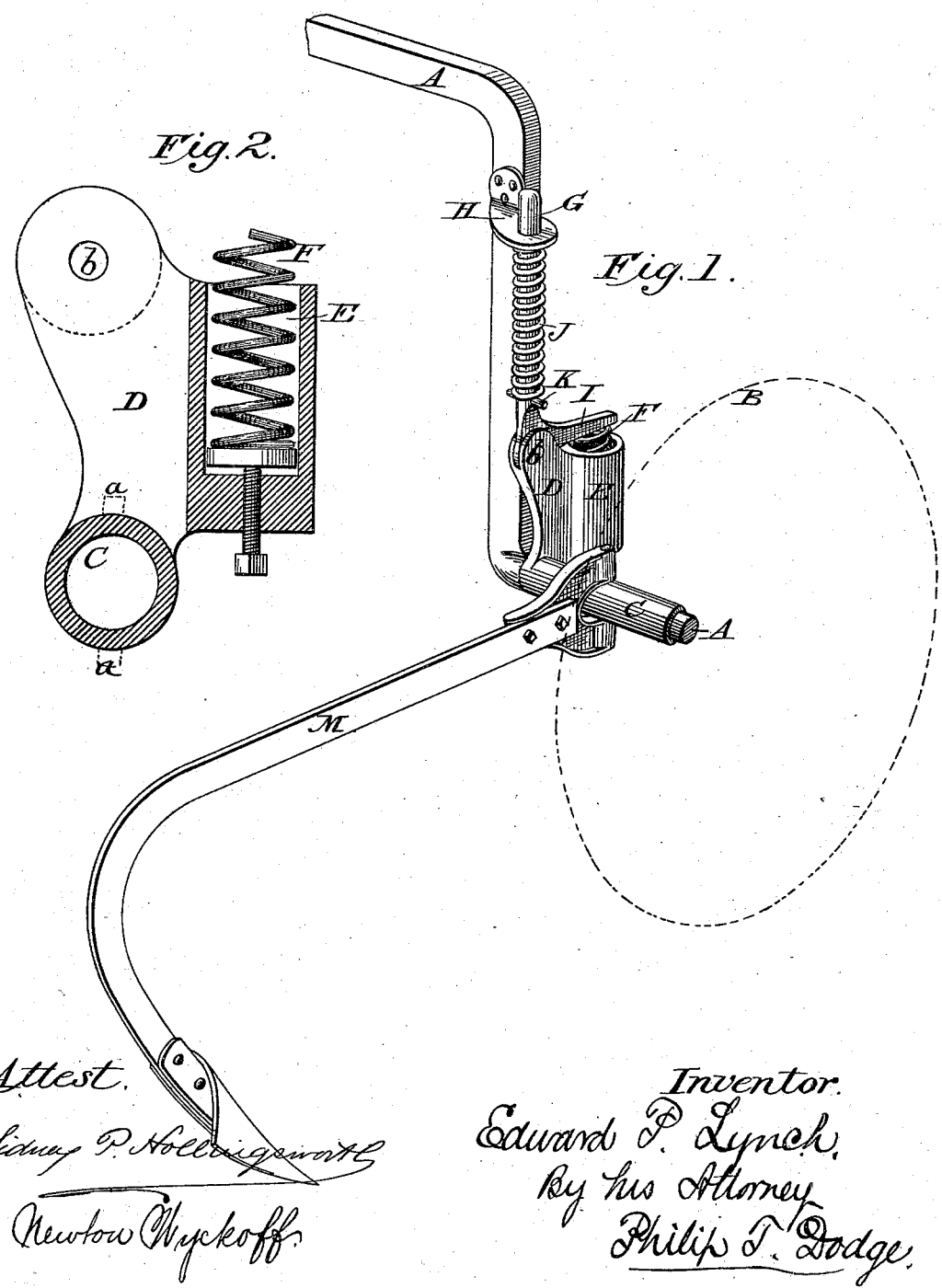

(No Model.) 2 Sheets—Sheet 2.
E. P. LYNCH.
WHEEL CULTIVATOR.
No. 257,730. Patented May 9, 1882.
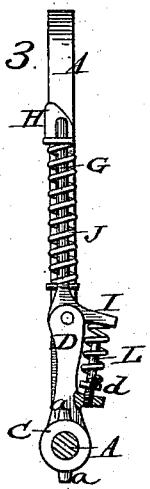
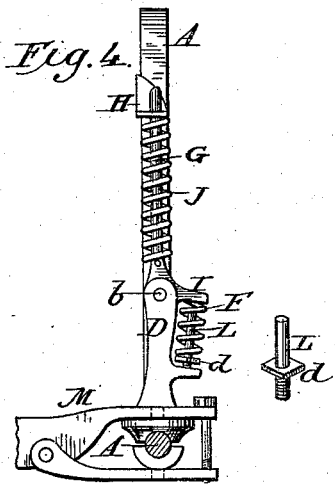
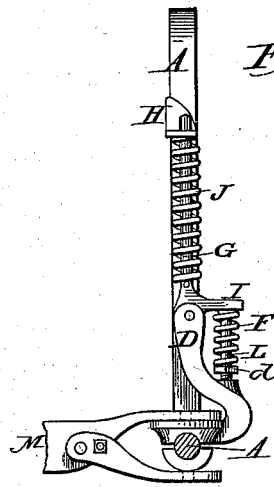
Attest.
Sidney P. Hollingsworth
Newton Wyckoff.
Inventor.
Edward P. Lynch
By his atty.
Philip T. Dodge.

UNITED STATES PATENT OFFICE.

EDWARD P. LYNCH, OF DAVENPORT, IOWA.

WHEEL-CULTIVATOR.

SPECIFICATION forming part of Letters Patent No. 257,730, dated May 9, 1882.

Application filed February 8, 1882. (No model.)

*To all whom it may concern:*

Be it known that I, EDWARD P. LYNCH, of Davenport, in the county of Scott and State of Iowa, have invented certain Improvements in Cultivators and Similar Machines, of which the following is a specification.

This invention relates to that class of wheeled cultivators and other agricultural machines wherein springs are applied to raise, or aid in raising, the beams or drag-bars by which the shovels are carried above an operative position, to remove the shovels or plows from the ground.

The object of the invention is to suspend the shovels in the ground and permit a free and easy motion therein when in action and to limit the descent of the shovels.

To this end the invention consists in combining with the beam and attendant parts a spring, which comes into action as the shovels enter the ground, to limit the descent of the beam, in combining this spring with the usual lifting-spring in such manner that the two act alternately, and in various details hereinafter described.

The invention is susceptible of embodiment in different forms, the drawings representing the preferred constructions.

Referring to the accompanying drawings, Figure 1 is a perspective view, illustrating one side of a cultivator with my device applied thereto. Fig. 2 is a vertical section through the arm and socket upon which the springs operate. Figs. 3, 4, and 5 are side elevations, illustrating modified constructions of my devices.

The devices may be applied to cultivators or other machines of different constructions, but are designed more particularly for the ordinary two-horse walking-cultivators—such, for example, as that represented in the patent to E. A. Wright, June 7, 1881, No. 242,497, wherein the beams are coupled to the ends of an arched axle sustained on wheels and provided with a tongue or draft-frame, and such is the machine represented in the drawings.

Referring to Figs. 1 and 2, A represents the arched axle, having its ends extended horizontally to receive the supporting-wheels B. C represents a tubular box or coupling, which may be made in one piece, as usual, mounted loosely on the axle and provided with studs $a$, to which the plow-beams M, or heads thereon, are journaled, as usual, so that by turning the box forward the beam and its shovels may be elevated, while at the same time the beam is allowed an independent lateral motion. On the inner end of the tubular box there is formed or secured rigidly an upright arm, D, having on the forward side a vertical socket, E, closed at the bottom, and open at the top to receive a spiral spring, F, the upper end of which rises above the socket, as shown.

To the upper end of the arm D, I pivot at $b$ an upright rod, G, the upper end of which slides through a guide-plate, H, secured to the upright portion of the main axle. At its lower end the pivoted rod is provided with a rigid forwardly-extending finger, I, in position to act upon and compress the spring F as the coupling is turned backward with the descending beam.

Around the body of the rod G there is mounted a strong spiral spring, J, bearing at the upper end beneath the fixed plate H and at the lower end against a pin, K, seated in the rod, and urging the rod downward. The parts are so proportioned and disposed that, as the shovels in descending closely approach an operative position, the rod, the pivot $b$, and the center of the axle stand in line, so that the spring J and the rod are inoperative. As soon as the beam and shovel are raised, turning the box forward and throwing the pivot $b$ forward, the rod, urged downward by the spring, tends to force the arm and coupling forward, thereby elevating the beam. During this operation the spring F has little or no practical effect. When, however, the beam and shovels are lowered beyond the point at which the spring begins its lifting action, so that the pivot $b$ passes behind the plane of the axle and rod, the spring F is subjected to a compressing action by the finger I, and at once resists any further descent of the shovels, suspending them with an elastic yielding action in the ground. The shovels thus suspended may be raised, lowered, and moved laterally when in action by the attendant, as demanded in practice, with great ease. The suspending action of the spring F may be counteracted to a limited extent by a downward pressure of the rod as the latter is carried backward by the arm. The beam, being held by these opposing influences, will remain practically fixed in its operative position, but may be moved and adjusted easily.

It will be seen that under my system of construction the elevating and the suspending springs are practically independent of each other, and that they operate alternately, each diminishing its effect as the effect of the other increases. This feature I desire to secure broadly, as it is manifest to the skilled mechanic that the devices may be modified in form and arrangement greatly without in fact materially changing the mode of action or passing beyond the limits of my invention. If desired, the arm D may be made adjustable forward and backward around the pipe-box to vary the depth of the shovels in the ground. The same end may be also secured by introducing an adjustable screw through the lower end of the socket, as shown, or through the finger I, to act upon and vary the tension of spring F.

Referring to Fig. 3, the arrangement therein represented is essentially the same as that shown in the preceding figures, the main difference being that in place of providing the arm D with a socket to receive the spring it is provided with an adjustable standard or spindle, L, upon and around which the spring F is mounted. The spindle L has its lower end threaded and seated in a lug or projection on the arm D, and is provided above the threaded portion with a shoulder or enlargement, d, to form a seat for the spring. The shoulder d is made of angular form in order to form a bearing for a wrench or other tool, by means of which the spindle may be screwed upward or downward, so as to vary the tension of the spring F and the force exerted thereby.

Referring to Fig. 4, the arrangement represented differs from those previously described, in that the box or coupling, instead of being made of tubular form in one piece, is made of two parts or halves applied to the upper and under side of the axle—an arrangement which is common and well known in the art. The studs or journals a, upon which the plow-beam or coupling turns, are formed on the upper and lower sides of the half-boxes. The arm D is secured in this case rigidly to the upper side of the plow-beam or the coupling by which the plow-beam is connected to the boxes, the arm being provided, as in the preceding cases, with an adjustable spindle to sustain the spring F. In this arrangement the downward pressure of the lifting-spring J tends to cause an excessive friction between the beam and the coupling-boxes, interfering somewhat with the free lateral motion of the beam.

The arrangement represented in Fig. 5 is designed to avoid the difficulty last mentioned. It differs from the arrangement represented in Fig. 4, in that the upright arm D is formed rigidly upon or secured rigidly to the upper half of the coupling-box, whereby the downward pressure of the spring is thrown directly upon the axle, without tending to create friction between the beam and the coupling-box. The beam is consequently permitted to swing laterally with great freedom.

While the two springs in my attachment, so far as their main operations are concerned, are brought into action alternately, it will be perceived that when the beam is in an operative position the spring J assists to urge it downward, while the spring F, on the contrary, tends to urge it outward. An equilibrium exists when the beam is in an operative position, the one spring tending at such time to urge the beam downward, while the other tends to urge it upward. When the beam is urged either upward or downward from an operative position the action of one or the other of the springs becomes the greater. It will be understood that the depressing action of the spring J continues until the beam is lifted to a very slight extent above its operative position, after which the spring changes its action and tends to urge the beam upward.

Having thus described my invention, what I claim is—

1. In combination with a vertically-swinging plow-beam, a lifting-spring and a suspending-spring, arranged to operate substantially as described and shown.

2. In combination with a vertically-swinging beam, a spring to raise the same out of action and a spring to suspend the same in an operative position, the two arranged to operate alternately.

3. In combination with the plow-beam and the upright arm connected thereto, the rod pivoted to said arm and provided with the finger, the guide for the rod, and the two springs applied substantially as shown.

4. The combination of the beam and its rigid arm, the movable rod pivoted to the arm, and the compression-spring located between the rod and arm forward of their connecting-pivot, to suspend the beam in an operative position, substantially as described.

5. In combination with the vertically-swinging beam and the arm D, connected therewith, the rod J, jointed to said arm, the spring F, to limit the descent of the beam, located directly between the arm and rod, forward of their connecting-joint, and the adjustable spring-sustaining spindle L, as described and shown.

6. The combination of the beam, the upright arm connected rigidly therewith, the movable rod pivoted to said arm, the suspending-spring F, located between the arm and rod, to sustain the beam in an operative position, and the adjustable spindle L, mounted and arranged to support the spring.

7. The coupling-box for a cultivator, provided with the upright arm D, and a spindle, L, adapted to support a spiral spring, as described and shown.

8. In combination with a vertically-moving beam, two springs, substantially as described, one tending to raise and the other to depress the beam when the latter is in an operative position.

9. In combination with the vertically-swinging beam, the spring attachment constructed, substantially as shown, with two springs, which tend one to raise and the other to depress the beam when it is in an operative position, whereby the beam is held by spring-pressure from either rising or falling, as set forth.

EDWARD P. LYNCH.

Witnesses:
A. L. SKEELS,
NATHL. FRENCH.